United States Patent
Funk et al.

[11] Patent Number: 5,801,366
[45] Date of Patent: Sep. 1, 1998

[54] AUTOMATED SYSTEM AND METHOD FOR POINT-OF-SALE (POS) CHECK PROCESSING

[75] Inventors: Wade L. Funk, Plano; Walter C. Jackson, Carrollton, both of Tex.

[73] Assignee: Electronic Data Systems Corporation, Plano, Tex.

[21] Appl. No.: 623,439

[22] Filed: Mar. 28, 1996

[51] Int. Cl.⁶ .............................. G06K 5/00; G06F 17/60
[52] U.S. Cl. ...................... 235/380; 235/379; 235/375
[58] Field of Search ........................ 235/379, 380, 235/382, 375; 364/405, 401, 408; 340/825.3, 149

[56] References Cited

U.S. PATENT DOCUMENTS

| | | | |
|---|---|---|---|
| 4,015,701 | 4/1977 | Templeton | 197/127 R |
| 4,027,142 | 5/1977 | Paup et al. | 235/61.9 R |
| 4,109,238 | 8/1978 | Creekmore | 340/149 A |
| 4,201,978 | 5/1980 | Nally | 340/146.3 |
| 4,277,689 | 7/1981 | Thomas et al. | 250/567 |
| 4,404,649 | 9/1983 | Nunley et al. | 364/900 |
| 4,523,330 | 6/1985 | Cain | 382/7 |
| 4,617,457 | 10/1986 | Granzow et al. | 235/379 |
| 4,672,377 | 6/1987 | Murphy et al. | 340/825.34 |
| 4,678,895 | 7/1987 | Tateisi et al. | 235/379 |
| 4,727,243 | 2/1988 | Savar | 235/379 |
| 4,810,866 | 3/1989 | Lord, Jr. | 235/379 |
| 4,891,503 | 1/1990 | Jewell | 235/380 |
| 5,053,607 | 10/1991 | Carlson et al. | 235/379 |
| 5,054,092 | 10/1991 | LaCaze | 382/11 |
| 5,245,164 | 9/1993 | Oyama | 235/379 |
| 5,253,345 | 10/1993 | Fernandes et al. | 395/275 |
| 5,265,007 | 11/1993 | Barnhard, Jr. et al. | 364/408 |
| 5,285,384 | 2/1994 | Gineris | 235/379 |
| 5,308,959 | 5/1994 | Cherry | 235/379 |
| 5,310,997 | 5/1994 | Roach et al. | 235/375 |
| 5,393,963 | 2/1995 | Thomas et al. | 235/379 |
| 5,484,988 | 1/1996 | Hills et al. | 235/379 |
| 5,491,325 | 2/1996 | Huang et al. | 235/379 |

FOREIGN PATENT DOCUMENTS

| | | | |
|---|---|---|---|
| 0 661 654 A2 | 7/1995 | European Pat. Off. | G06F 17/60 |
| 2 508 678 | 12/1982 | France | G06F 15/30 |
| WO 86/00441 | 1/1989 | WIPO | G06F 15/21 |
| WO 93/02424 | 2/1993 | WIPO | G06F 15/30 |

*Primary Examiner*—Thien Minh Le
*Attorney, Agent, or Firm*—Terry J. Stalford; L. Joy Griebenow

[57] ABSTRACT

An automated check processing system includes an input device receiving checking account information and a check amount of a check provided for payment in a translation. A transaction database coupled to the input device then electronically receives and stores the checking account information and check amount, which are then downloaded to a power encoder. The power encoder receives checking account information and check amount for transactions occurring over a predetermined transaction period, and then matches the checks with the electronic checking account information and check amounts. A check having a match results in the electronic checking amount being encoded on its face.

21 Claims, 2 Drawing Sheets

AUTOMATED SYSTEM AND METHOD FOR POINT-OF-SALE (POS) CHECK PROCESSING

TECHNICAL FIELD OF THE INVENTION

This invention is related in general to the field of document handling systems. More particularly, the invention is related to an automated system and method for point-of-sale check processing.

BACKGROUND OF THE INVENTION

The typical check processing procedure in use today is a long and tedious process, which requires one or more processing days and multiple repetitive steps. The procedure includes many opportunities for errors to be introduced.

The typical check processing procedure is shown in FIG. 1 and begins, for example, at a retailer or point-of-sale. The cashier enters all the purchases and the register provides a total. The customer writes out a check for a specific dollar amount and presents it as payment for the amount owed, as shown in block 100. The retailer may check its internally-maintained "bad check" list or with a check authorization service to determine if the account being drawn on has a history of under-funded checks. If the account has not been black listed, then the checking account owner may leave the retailer with the goods that were purchased. At the end of the day, the total of all checks received that day are totaled to compare with the register total. The register totals are combined to form a store total. The checks are then deposited with the retailer's bank.

Some retailers have facilities to encode the transaction amounts on the checks before the checks are sent to the bank. Otherwise, the bank encodes the amounts on the checks and charges the retailer a fee for this service, as shown in block 102. The encoding process is performed manually, with an operator physically handling each check, viewing the amount, and then keying it on the face of the check. The check amount is then encoded in magnetic ink on the face of the check in a predetermined field or location, such as the bottom right of the check in alignment with the MICR line. The encoding speed per operator is slow, typically 1,200 to 1,400 checks per hour. Because this processing step relies heavily on the human operator, who must process a large quantity of documents in a short time, it is prone to errors. The check amount may be misread due to poor penmanship and a number of other reasons or the amounts may be entered incorrectly. The encoded checks are then tallied and compared with the total on the deposit ticket. This process is commonly termed "proofing."

The encoded checks are then shipped to a central processing location for the "capturing" step, as shown in block 104. High speed reader/sorters process the checks by reading and sorting the checks according to information printed on the MICR (magnetic ink character recognition) line located at the bottom of the check. The MICR information on the check includes the bank number, account number, check serial number, in addition to the encoded check amount. The checks are read and sorted by bank or some other designation according to the transit and routing information also present in the MICR line. Approximately 1 to 1.5% of checks are rejected because the MICR line information is not readable. The rejected checks are manually handled and corrected. A balance of credits and debits is then computed. The sorted checks and a cash letter listing each check and their amounts are then sent to the institutions owning the accounts that the checks are drawn on in a collection and transit process.

The transit process delivers the checks to the bank having the accounts the checks are drawn on, at which place another capturing process commonly termed "inclearing" is performed, as shown in block 106. Inclearing ensures that the checks are actually drawing on that bank's accounts, the amounts are encoded on the checks, the correct settlement amount is given to the other banks, and that the correct amount is finally settled or posted out of the customer's account, as shown in block 108. The checks may then be returned to the checking account owner, as shown in block 110.

It may be seen from the foregoing that the traditional check processing procedure is a time-consuming and tedious process. Each time the check is handled or encoded, an opportunity for error is introduced. As a result, check processing is a very costly procedure for banks and businesses.

SUMMARY OF THE INVENTION

Accordingly, there is a need for a system and method for point-of-sale check processing that eliminates repetitive and error-prone steps. As a result, the total check processing time and cost are reduced.

In accordance with the present invention, a system and method for point-of-sale check processing are provided which eliminates or substantially reduces the disadvantages associated with prior systems and processes.

In one aspect of the invention, an automated check processing system includes an input device receiving checking account information and a check amount of a check provided for payment in a transaction. A transaction database coupled to the input device then electronically receives and stores the checking account information and check amount, which are then downloaded to a power encoder. The power encoder receives checking account information and check amount for transactions occurring over a predetermined transaction period, and then matches the checks with the electronic checking account information and check amounts. A check having a match results in the electronic checking amount being encoded on its face.

In another aspect of the invention, the automated check processing method provides for receiving checking account information and a check amount of a check provided for payment in a transaction, and electronically transmitting the checking account information and check amount to a transaction database for storage therein. Thereafter, the stored information related to transactions occurring over a predetermined transaction period are electronically downloaded from the transaction database to a power encoder, which then matches the checks with the electronically downloaded checking account information and check amount, and then encodes the check amounts on respective matched checks.

In yet another aspect of the invention, a method for automated check processing provides for electronically recording and storing checking account information and check amounts of checks provided for payment in transactions occurring over a predetermined transaction period at the time of each transaction, and then electronically matching the checks with the electronically recorded checking account information and check amounts. The match enables the check amounts to be electronically encoded on the respective matched checks.

BRIEF DESCRIPTION OF THE DRAWINGS

For a better understanding of the present invention, reference may be made to the accompanying drawings, in which.

DETAILED DESCRIPTION OF THE INVENTION

Figure 1:
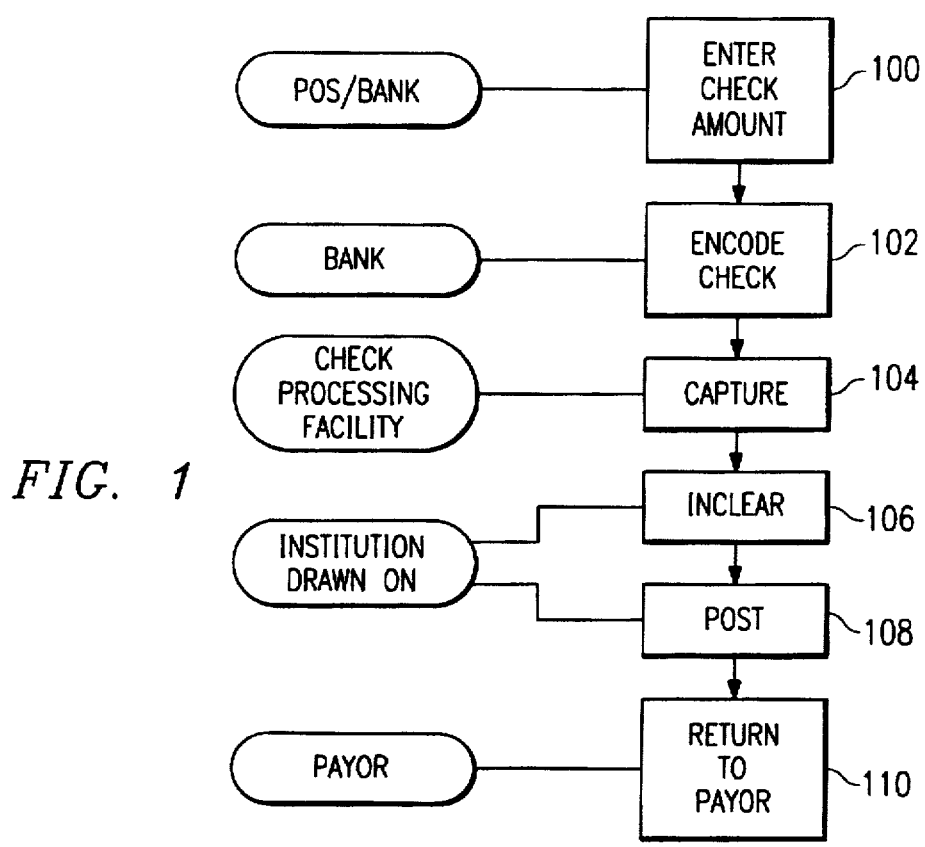
FIG. 1 is a simplified diagram of a typical back office check processing procedure.
Figure 2:
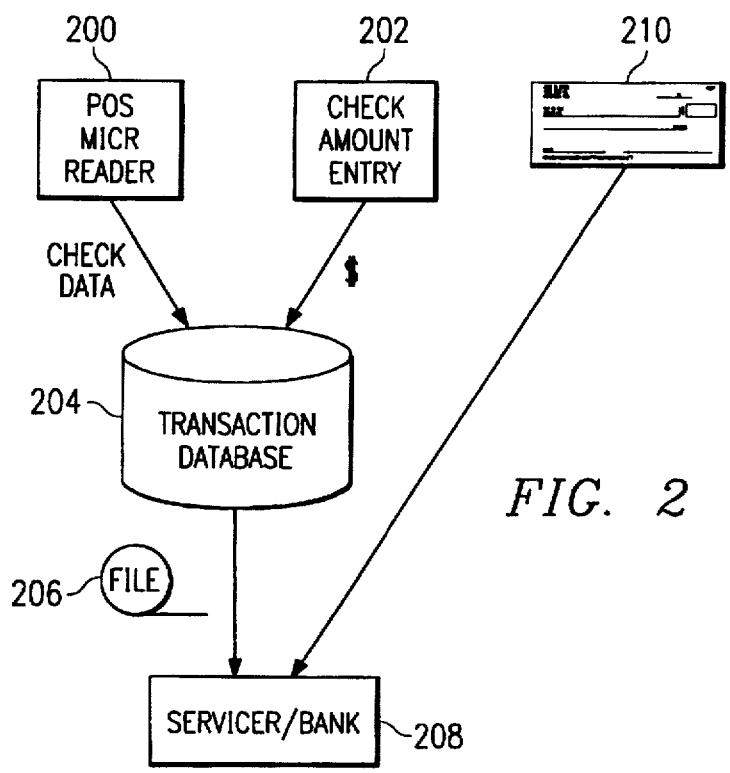
FIG. 2 is a simplified block diagram of a automated point-of-sale check processing system and method therefor constructed according to the teachings of the present invention.
Figure 3:
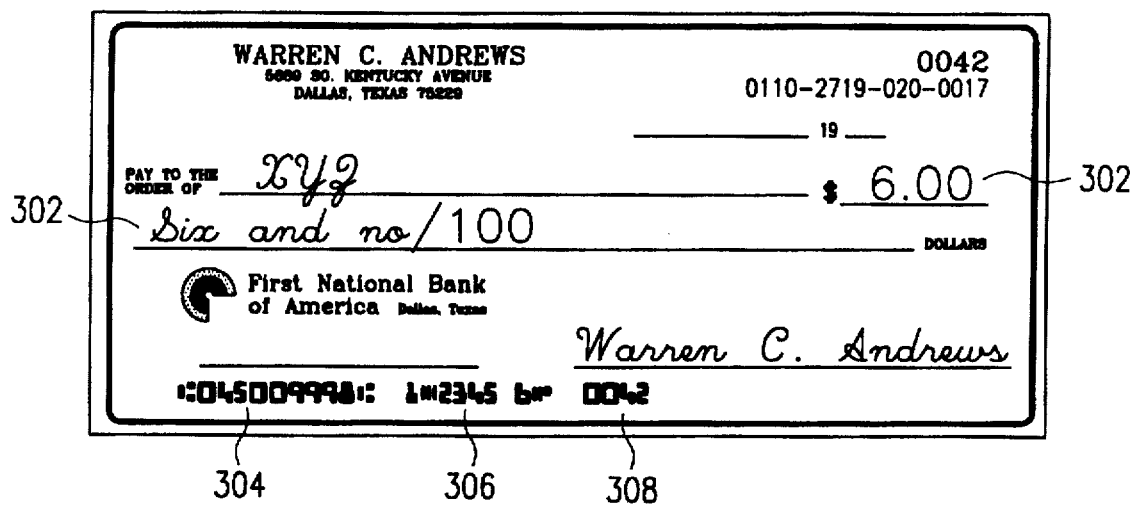
FIG. 3 is a representation of a check.
Figure 4:
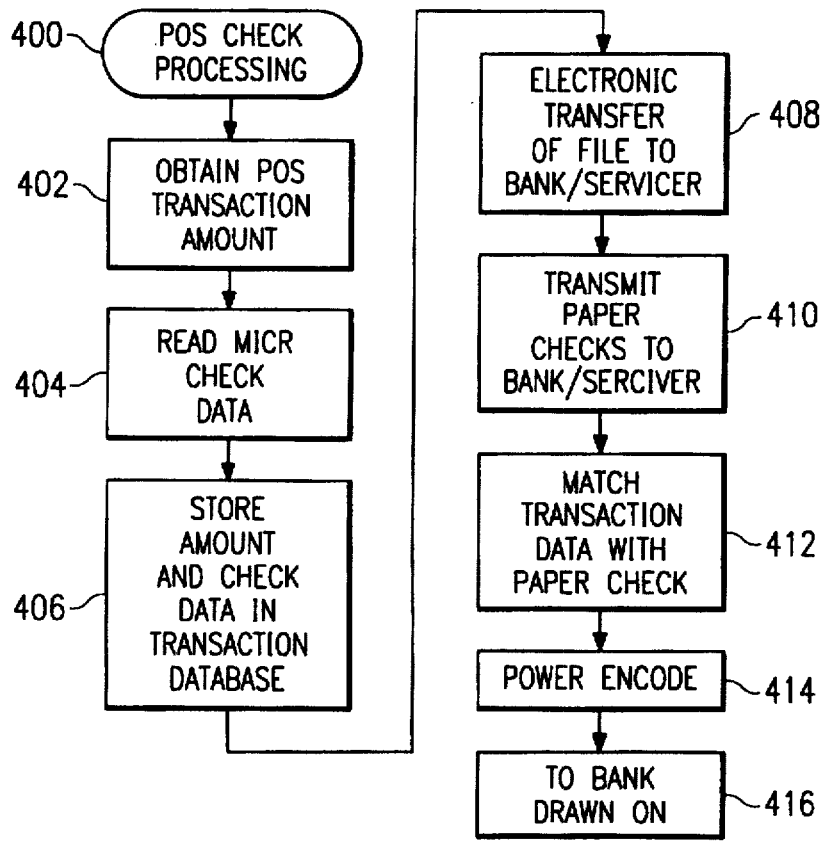
FIG. 4 is a flowchart of an automated point-of-sale check processing procedure according to the teachings of the present invention.

The preferred embodiment(s) of the present invention is (are) illustrated in FIGS. 2–4, like reference numerals being used to refer to like and corresponding parts of the various drawings.

FIGS. 2 and 4 are a block diagram and a flowchart of automated point-of-sale (POS) check processing system and method therefor, respectively, and both are referenced in the description below. Beginning at block 400 of FIG. 4, automated POS check processing begins by obtaining a transaction amount, as shown in block 402. The transaction amount may represent the total sum for the purchases made or the services rendered. Assuming the transaction amount equals the check amount for purposes of simplicity, this amount is entered as the amount written on the check. If, in reality, the check amount is not the same as the transaction amount, the check amount entered reflects only the amount written on the check regardless of the transaction amount. Check amount entry may be performed by the cashier on a numerical keypad 202 (FIG. 2) or the like. The check is also passed through a MICR reader 200 to read the checking account information pre-printed on the check, as shown in block 404. FIG. 3 shows a representation of a check 300, with the MICR line located on the bottom of the check. Numerals 304 are transit and routing information, numerals 306 are the checking account number, and numerals 308 are the check serial number. The check amount 302 is written in two fields on the face of the check.

The checking account information and the check amount are transmitted electronically to a transaction database 204 where they are stored, as shown in block 406. The connection between MICR reader 200 and check amount entry device 202 to transaction database 204 may be via a dedicated or switched telecommunications line. Although shown as separate entities, MICR reader 200 and check amount entry device 202 may be implemented as an integrated input device. MICR reader 200 and check amount entry device 202 may be alternatively integrated with a point-of-sale cash register.

Throughout a predetermined transaction period, such as each day of operation, the data associated with all transactions taking place at the point-of-sale are transmitted at the time of presentment and recorded in transaction database 204. At the end of the transaction period, all transaction check data 206 are then downloaded or otherwise transferred electronically to the retailer's banking institution or a servicer 208 contracted to perform check processing for that banking institution, as shown in block 408. Alternatively, the transaction data for a transaction period may be stored on-site at the point-of-sale and downloaded or transferred at the end of the transaction period to transaction database 204 in one batch.

In addition, the paper checks 210 associated with the same transaction period are also sent to banking institution or servicer 208, as shown in block 410. Bank or servicer 208 then begins check processing by matching the electronic record, including the checking account information of each transaction, with the paper check, as shown in block 412. Subsequently, since the check amount is electronically available, the checks may be processed by the traditional capture process in which they are power-encoded with the check amounts, as shown in block 414.

The automated power encoding machinery first reads the MICR data on the paper check, and matches it with the electronic transaction data in the file that were transmitted. The check amount in the electronic data is read and then encoded on the paper check in the proper field or location. Magnetic ink or an otherwise machine-readable medium is used to encode the check amounts. Automated machinery for matching and power encoding is commercially available and in use today in the remittance environment where checks are submitted with a statement for paying bills, such as mortgage, utility, and credit cards. Examples of the power encode machinery include the Banctec® UT1000 and BT5300, NCR® (National Cash Register®) 7780, and the UNISYS® DP500. The power encoding process is a high-speed process in which 600 to 1,000 checks may be processed per minute. After the power encode step, the paper checks are sorted by destination and forwarded to the bank owning the accounts to be posted to the accounts, as shown in block 416. Many power encoding machinery also perform this sorting function.

In operation, the time-consuming and tedious step of proofing and manually encoding the checks with the check amounts is eliminated by the automated system and method of the present invention. Recall that the encoding process is manually performed at a speed of typically 1,200 to 1,400 checks per hour compared with the power encoding process at a speed of 36,000 to 60,000 checks per hour. Because the manual encoding step is eliminated, significant cost reduction is realized for the savings in labor, machinery, and office space. Errors that may be introduced at this step are also avoided.

Although the present invention and its advantages have been described in detail, it should be understood that various changes, substitutions and alterations can be made therein without departing from the spirit and scope of the invention as defined by the appended claims.

What is claimed is:

1. An automated check processing system, comprising:
   a transaction database coupled to an input device for electronically receiving and storing checking account information and a check amount; and
   a power encoder electronically receiving from said transaction database said checking account information and check amount for transactions occurring over a predetermined transaction period, and further receiving said checks provided for payment in said same transactions occurring over said same predetermined transaction period, said power encoder matching said checks with said electronic checking account information and check amounts, and encoding said check amounts on said matched checks.

2. The system, as set forth in claim 1, wherein said input device comprises a MICR reader for reading MICR data line.

3. The system, as set forth in claim 1, wherein said input device comprises at least a numerical keypad for entering said check amount.

4. The system, as set forth in claim 1, wherein said checking account information includes a routing and transit number and a checking account number.

5. The system, as set forth in claim 1, wherein said checking account information includes a check serial number.

6. The system, as set forth in claim 1, wherein said input device is coupled to said transaction database via a telecommunications line.

7. The system, as set forth in claim 1, wherein said power encoder encodes said check amount on said matched check in a machine-readable medium.

8. The system, as set forth in claim 1, wherein said power encoder encodes said check amount on said matched check in a magnetic ink.

9. A method for automated check processing, comprising the steps of:

receiving checking account information and a check amount of a check provided for payment in a transaction;

storing said checking account information and check amount in a transaction database;

electronically downloading checking account information and check amounts related to transactions occurring over a predetermined transaction period from said transaction database to a power encoder;

transmitting said checks provided for payment in transactions occurring over said same predetermined transaction period to said power encoder;

electronically matching said checks with said electronically downloaded checking account information and check amount; and encoding, by said power encoder, said check amounts on respective matched checks.

10. The method, as set forth in claim 9, wherein said checking account receiving step comprises the step of reading a pre-printed MICR line data on said check, further comprising the step of electronically transmitting said checking account information and check amount to said transaction database for storage therein.

11. The method, as set forth in claim 9, wherein said check amount receiving step comprises the step of electronically entering said check amount, further comprising the step of electronically transmitting said checking account information and check amount to said transaction database for storage therein.

12. The method, as set forth in claim 9, wherein said checking account information receiving step comprises the steps of machine-reading a routing and transit number and a checking account number pre-printed on said check, further comprising the step of electronically transmitting said checking account information and check amount to said transaction database for storage therein.

13. The method, as set forth in claim 9, wherein said checking account information receiving step comprises the steps of machine-reading a check serial number pre-printed on said check, further comprising the step of electronically transmitting said checking account information and check amount to said transaction database for storage therein.

14. The method, as set forth in claim 9, further comprising the step of electronically transmitting said checking account information and check amount to said transaction database via a telecommunications line.

15. The method, as set forth in claim 10, wherein said matching step comprises the steps of:

reading said MICR line data on said check; and searching said downloaded checking account information for a match with said MICR line data.

16. A method for automated check processing, comprising the steps of:

receiving electronically recorded checking account information and check amounts of checks provided for payment in transactions occurring over a predetermined transaction period at the time of each transaction;

electronically matching said checks with said electronically recorded checking account information and check amounts; and electronically encoding said check amounts on respective matched checks.

17. The method, as set forth in claim 16, further comprising the step of reading a pre-printed MICR line data on said check.

18. The method, as set forth in claim 16, further comprising the step of electronically entering said check amount.

19. The method, as set forth in claim 16, further comprising the step of machine-reading a routing and transit number and a checking account number pre-printed on said check.

20. The method, as set forth in claim 16, further comprising the step of machine-reading a check serial number pre-printed on said check.

21. The method, as set forth in claim 17, wherein said matching step comprises the steps of:

reading said MICR line data on said check; and searching said downloaded checking account information for a match with said MICR line data.

* * * * *